(12) United States Patent
Oh et al.

(10) Patent No.: US 9,147,917 B2
(45) Date of Patent: Sep. 29, 2015

(54) BATTERY SYSTEM

(71) Applicants: Hyundai Motor Company, Seoul (KR); Kia Motors Corporation, Seoul (KR)

(72) Inventors: Man Ju Oh, Gyeonggi-do (KR); Jae Woong Kim, Gyeonggi-do (KR); Jae Woo Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 346 days.

(21) Appl. No.: 13/693,703

(22) Filed: Dec. 4, 2012

(65) Prior Publication Data

US 2014/0072846 A1 Mar. 13, 2014

(30) Foreign Application Priority Data

Sep. 7, 2012 (KR) .................. 10-2012-0099403

(51) Int. Cl.
  *H01M 10/6563* (2014.01)
  *H01M 2/10* (2006.01)
  *H01M 10/625* (2014.01)
  *H01M 10/6551* (2014.01)
  *H01M 10/6566* (2014.01)

(52) U.S. Cl.
  CPC ........ *H01M 10/5067* (2013.01); *H01M 2/1077* (2013.01); *H01M 10/625* (2015.04); *H01M 10/6551* (2015.04); *H01M 10/6563* (2015.04); *H01M 10/6566* (2015.04)

(58) Field of Classification Search
  CPC .................. H01M 10/6563; H01M 10/5067
  See application file for complete search history.

(56) References Cited

U.S. PATENT DOCUMENTS

| | | | |
|---|---|---|---|
| 3,733,836 A * | 5/1973 | Corini | 62/3.61 |
| 6,949,309 B2 | 9/2005 | Moores, Jr. et al. | |
| 8,535,104 B1 * | 9/2013 | Nida | 440/6 |
| 2005/0269994 A1 * | 12/2005 | Ishishita | 320/150 |
| 2007/0144804 A1 * | 6/2007 | Pike et al. | 180/170 |
| 2010/0075206 A1 * | 3/2010 | Tamura | 429/62 |
| 2010/0134940 A1 * | 6/2010 | Nguyen et al. | 361/91.1 |
| 2010/0291414 A1 * | 11/2010 | Bell et al. | 429/7 |
| 2012/0164508 A1 * | 6/2012 | Houchin-Miller et al. | 429/120 |
| 2012/0244398 A1 * | 9/2012 | Youngs et al. | 429/61 |

FOREIGN PATENT DOCUMENTS

| | | |
|---|---|---|
| JP | 08-241702 A | 9/1996 |
| JP | 2004-288527 A | 10/2004 |
| JP | 2011-119102 A | 6/2011 |
| KR | 10-2005-0018518 A | 2/2005 |
| KR | 10-2006-0036694 A | 5/2006 |
| KR | 10-2006-0102855 A | 9/2006 |
| KR | 10-2007-0041064 A | 4/2007 |
| KR | 10-2012-0069274 | 6/2012 |
| KR | 10-2012-0069274 A | 6/2012 |

* cited by examiner

*Primary Examiner* — Jeremiah Smith
(74) *Attorney, Agent, or Firm* — Mintz Levin Cohn Ferris Glovsky and Popeo, P.C.; Peter F. Corless

(57) ABSTRACT

A battery system is disclosed, including: an airtight housing; a plurality of blowers disposed on a side end of an interior of the housing configured to suction air toward a middle of the airtight housing and discharge the suctioned air to the side of the airtight housing; a battery pack unit disposed inside the airtight housing to form a plurality of rows wherein an air passageway traverses through a front portion and a rear portion of each row and is disposed at a middle of each blower to form a suction flow path and a discharging flow path; and a heat exchange device disposed on the discharging flow path in the airtight housing.

9 Claims, 3 Drawing Sheets

BATTERY SYSTEM

CROSS-REFERENCE TO RELATED APPLICATION

This application claims under 35 U.S.C. §119(a) the benefit of Korean Patent Application No. 10-2012-0099403 filed Sep. 7, 2012 the entire contents of which are incorporated herein by reference.

BACKGROUND (a) Technical Field

The present invention relates to a battery system, capable of improving efficiency of a battery used in a vehicle through cooling or heating of the battery.

(b) Background Art

Recently, efforts have been made in various industrial fields for replacing an internal combustion engine with an electrical engine to help solve environmental problems. Here, a battery serves as an alternative to fuel in the electrical engine and should maintain an optimal state of a fuel efficiency ratio or durability through increasing and decreasing a temperature of the battery used in the electrical vehicle and a hybrid vehicle.

Many conventional battery cooling and heating technologies are configured to suction air from an interior and an exterior of a vehicle and then transfer the air to the battery for cooling the battery through air convection. In the prior configurations for simultaneously cooling and heating the battery, as described above, a plurality of battery packs and electrical devices may be disposed inside a battery housing. Thus separate ducts may be disposed on a suction portion and a discharging portion for an air flow path for heat exchanging to be defined inside the battery pack and for air flow therethrough.

Further, separate flow channels may be disposed on the exterior of the battery pack for the air flow path to be defined therein and thus, there are limitations to designing the battery system and efficiency of the cooling configuration for the battery may not be achieved.

For example, in case of Korean Patent Application No. 10-2012-006927A, entitled "A battery pack including radial fans", it relates to a battery pack including radial fans in which the radial fans are arranged such that the input and output direction of cooling air becomes perpendicular to the directions of the cooling air traversing through a plurality of battery cells to design a more efficient the flow path of the cooling air. However, under this configuration of the battery pack, separate channels and ducts for the cooling air flow must be provided, the cooling effect may decrease due to the substantially long cooling air flow.

The items described above are provided just to help in understanding of the background of the present invention, and shall not be construed to admit that they correspond to the technologies already known to those skilled in the art to which the present invention pertains.

SUMMARY OF THE INVENTION

The present invention has been made in an effort to solve the above-described problems associated with prior art. An object of the present invention is to provide a battery system, capable of minimizing cooling air flow, and decreasing the space required for heating and cooling the battery system components.

In one embodiment, the battery system includes: a substantially airtight housing; a plurality of blowers disposed on a side end of an interior of the airtight housing and the plurality of blowers configured to suction air toward a middle of the airtight housing and to discharge the suctioned air to a side of the airtight housing; a battery pack unit disposed inside the airtight housing to form a plurality of rows wherein an air passageway traversing through a front portion and a rear portion of each row is formed in the plurality of rows; the air passageway is in a substantial middle of the blower to form a suction flow path; the discharging side of the blower forms a discharging flow path along an inner wall on the side of the housing; and a heat exchange device disposed on the discharging flow path in the airtight housing.

A battery pact unit may be arranged to form a plurality rows and columns wherein partitions may be disposed between the respective columns for each suction flow path. A blower unit disposed on each respective column of the battery pack unit configured to discharge the flow path B. The battery pack unit may include two columns in the airtight housing wherein the battery pack on each column is spaced from the side end inner wall of the airtight housing to form the discharging flow path. The upper surface and the lower surface of the battery pack may be near the inner wall of the airtight housing not to form a flow path.

The substantially middle of the blower may be disposed aligned with the air passageway of the battery pack wherein the blower and the battery pack are spaced apart in a predetermined distance. Additionally, an airtight guide surrounding an edge of the blower and may form a closed flow path together with the air passageway. Furthermore, a discharging opening connected to the discharging flow path may be formed in the airtight guide.

Moreover, a heat exchange device may be disposed on the airtight guide wherein the heat exchange device and toward the discharging opening. The heat exchange device may be disposed such that a plurality of radiation fins connected thereon are disposed on a discharging side of the blower. The plurality of radiation fins may be formed on the heat exchange device and the direction of the plurality radiation fins may be the same as the discharged air.

The battery pack unit may be arranged as two columns in the interior of the airtight housing in which the battery packs on each column may be spaced from the side end inner wall and a rear end inner wall of the airtight housing to form the discharging flow path. Additionally, the upper surface and the lower surface of each battery pack may be near the inner wall of the airtight housing not to form a flow path. Furthermore, a partition may be formed on the battery pack unit in each column to separate the flow paths at each adjacent rear end.

The respective rows of the battery pack unit may be spaced frontward and rearward and further an air-guide may be disposed on a suction input from the discharging flow path.

BRIEF DESCRIPTION OF THE DRAWINGS

The above and other features, objects and advantages of the present invention will now be described in detail with reference to exemplary embodiments thereof illustrated in the accompanying drawings which are given hereinbelow by way of illustration only, and thus are not limitative of the present invention, and wherein.

Figure 1:
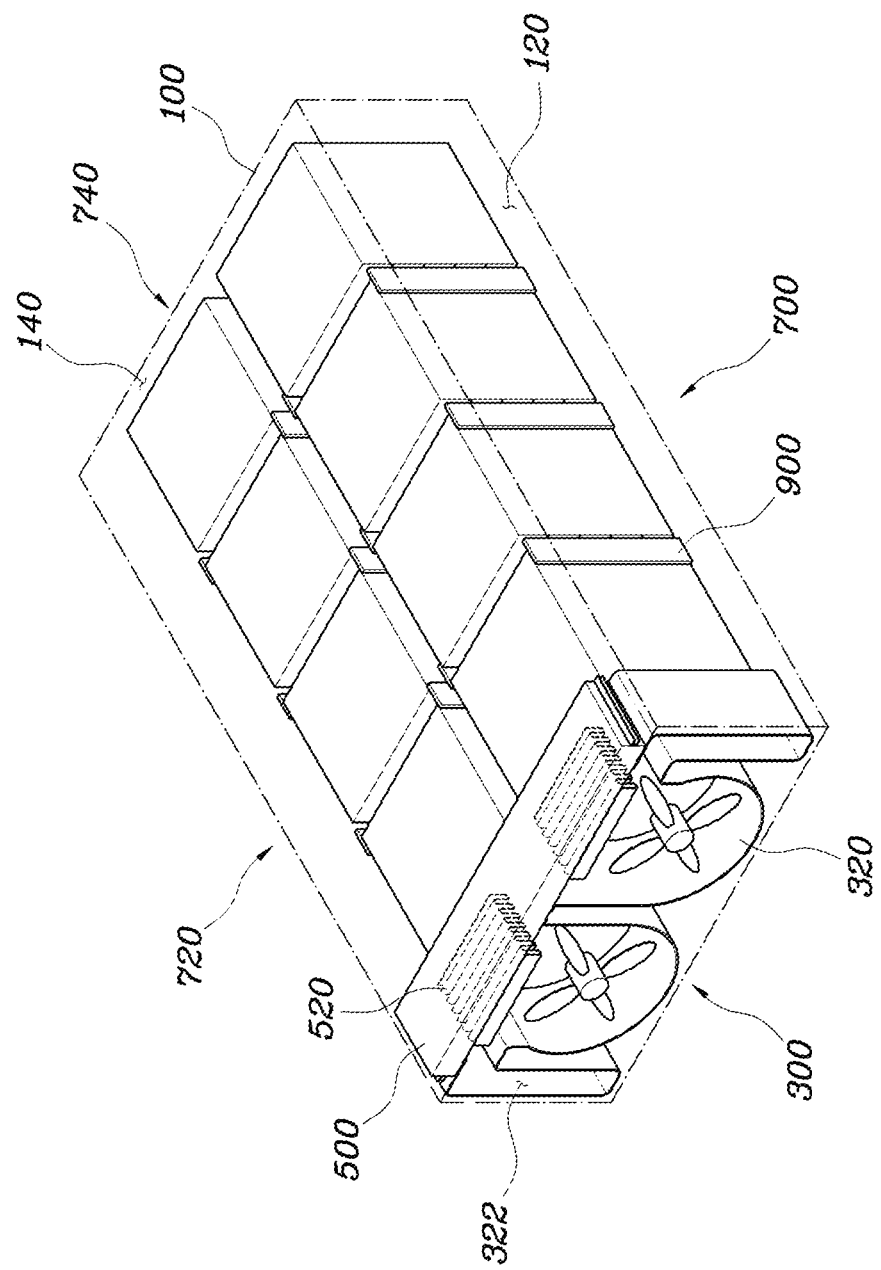
FIG. 1 is an exemplary view illustrating a battery system according to an exemplary embodiment of the present invention.
Figure 2:
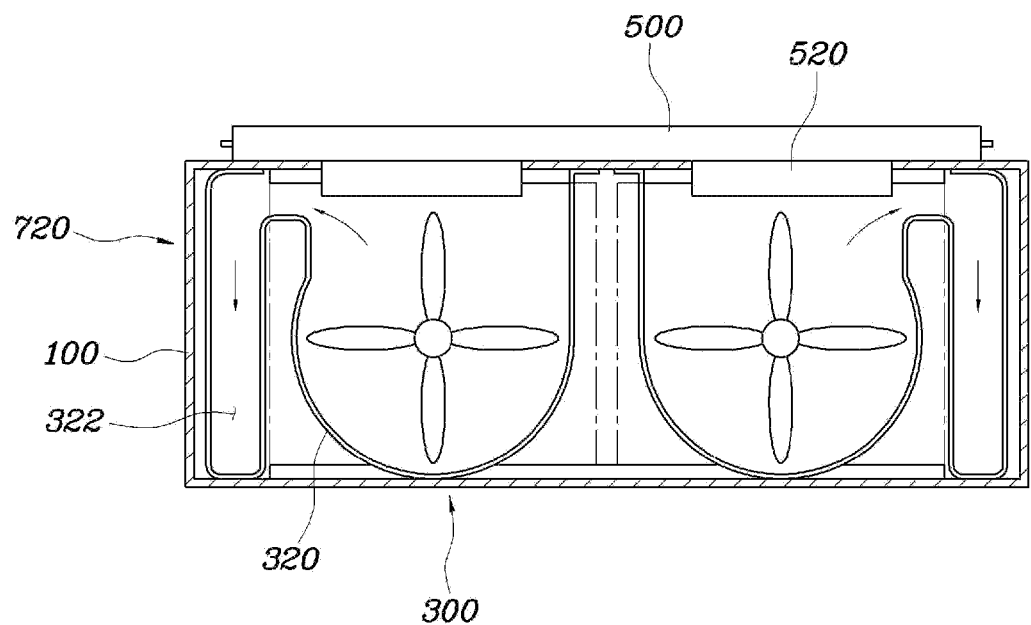
FIG. 2 is an exemplary front view illustrating a battery system according to an exemplary embodiment of the present invention.
Figure 3:
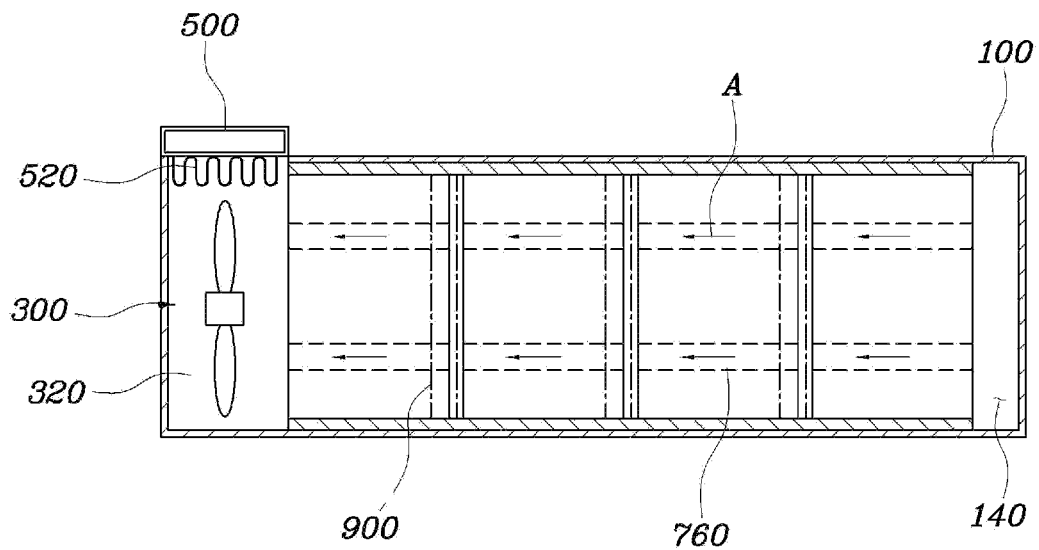
FIG. 3 is an exemplary side-sectional view illustrating a battery system according to an exemplary embodiment of the present invention.
Figure 4:
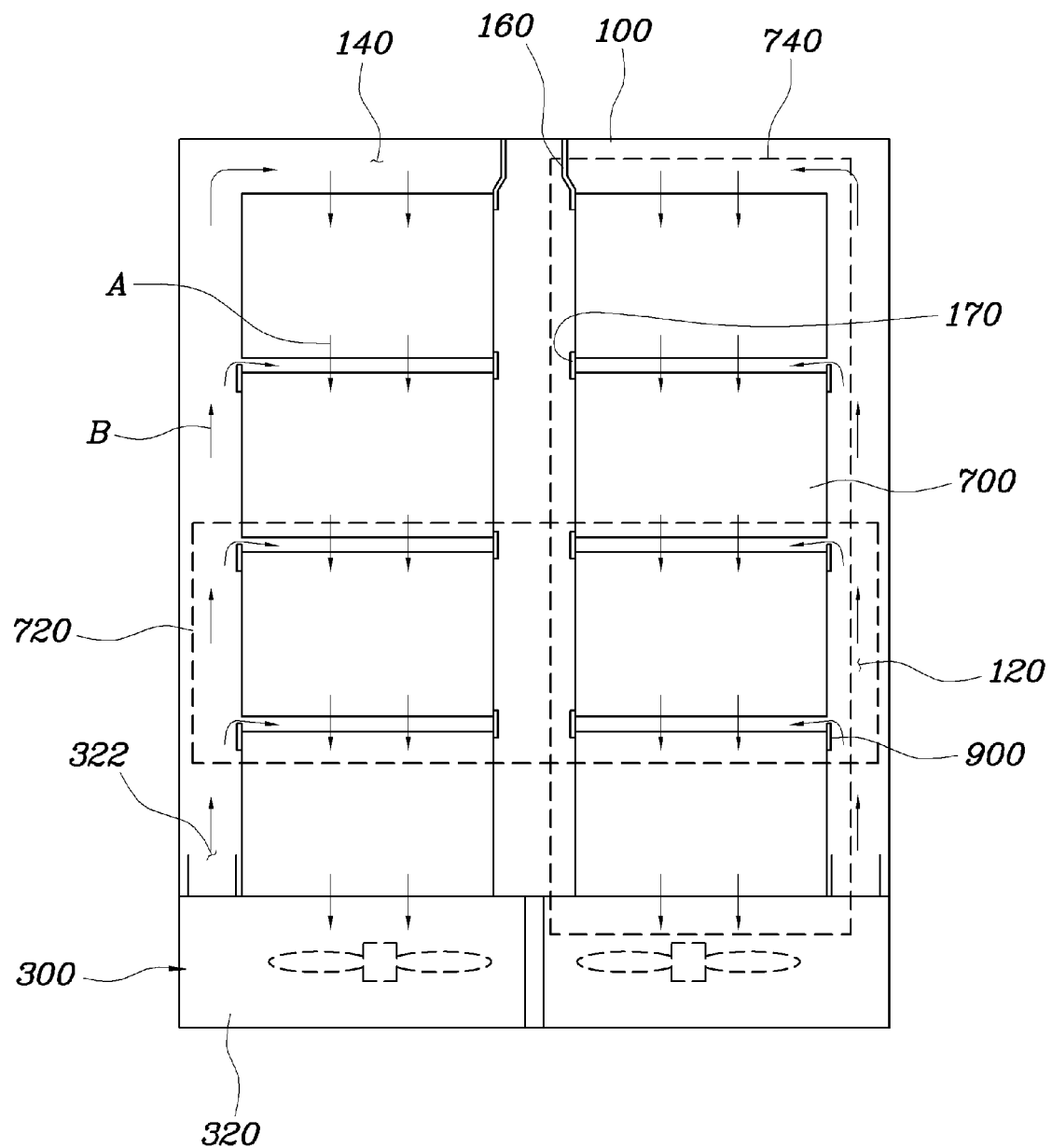
FIG. 4 is an exemplary plane-sectional view illustrating a battery system according to an exemplary embodiment of the present invention.

It should be understood that the accompanying drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a battery system for a vehicle according to an exemplary embodiment of the present invention will be described with reference to the accompanying drawings.

A battery system according to an embodiment of the present invention includes: a substantially airtight housing 100; a plurality of blowers 300 disposed on a front portion and a rear portion of an interior of the airtight housing, respectively, the plurality of blowers configured to suction and discharge the air toward a substantially middle of the airtight housing and discharge and suction the air to both sides of the airtight housing; a battery pack 700 disposed between the plurality of blowers 300 to form a plurality of rows 720 wherein an air passageway 760 traverses through a front portion and a rear portion of each row may be formed, and a mixing section 160 configured to mix air may be formed between the plurality of rows 720 disposed in the substantially middle of the airtight housing 100; and a heat exchange device 500 disposed on an air flow path of both sides of each blower 300.

The battery system according to the present invention may include the substantially airtight housing 100 eliminating external air from being input and output. Moreover, a portion of air in the interior of the airtight housing may leak out of the airtight housing due to manufacturing error; however, the battery may be cooled or heated by using only the air in the interior thereby minimizing heat output and increasing energy efficiency.

The plurality of blowers 300 may be disposed one side of the interior of the housing 100 wherein the blower is disposed on a front portion of the interior in the present embodiment of the present invention. Each blower 300 may include with a plurality of fans to suction air toward the substantially middle of the airtight housing and to discharge the air to both sides of the airtight housing. Accordingly, the interior air of the airtight housing may be suctioned toward the middle and discharged to a side of the airtight housing through the blower and circulated within the airtight housing.

Moreover, the heat exchange device 500 may be disposed on a discharging side of the blower 300. The heat exchange device 500 may be disposed within the airtight housing 100 wherein the heat exchange device may receive electric energy and exchange heat, and may cool the interior air of the airtight housing 100. In other words, the heat exchange device 500 may be disposed on a discharging side of the blower 300 and may cool or may heat the interior air of the airtight housing 100 while the interior air circulates.

The battery pack unit 700 may be disposed in the interior of the airtight housing 100 to form a plurality of rows 720 and a plurality of columns 740. The air passageways 760 each traverse through the front portion and the rear portion of the airtight housing and may be formed in the respective battery packs 700. Accordingly, the air passageways 760 of the respective battery packs 700 may form a plurality of suction flow paths A on each row 740 of the battery pack unit. Further, each blower suctions air along the suction flow path A. The plurality of rows 720 in the battery pack unit 700 may be spaced from the side inner wall of the airtight housing at a predetermined distance 120. A discharging flow path B may be formed from the discharging side of each blower 300.

Accordingly, the air suctioned toward each blower 300 along the suction flow path A may be discharged to the discharging flow path B and then suctioned toward the battery pack unit 700 while the air is circulated through the battery pack unit 700 to cool the air. Additionally, the heat exchange device 500 may be disposed on the discharging flow path B to cool or to heat the air and thus the air may be cooled in an airtight space to achieve increased air cooling efficiency in a narrow space without forming a separate duct or channel Moreover, the battery pack unit 700 may be arranged to form the plurality of rows 720 and the plurality of columns 740 wherein partitions 160, 170 are disposed between the respective columns 740. The partitions 160,170 may be provided for preventing the air from mixing between the respective columns 740 on the suction flow path A. In this configuration, a substantially straight air flow may be formed to decrease air flow resistance and improve air-conditioning efficiency since there is a suction flow path A in the battery pack unit 700 in the respective columns 740.

Further, the plurality of blowers 300 may be disposed between the columns 740 of the respective battery packs and the discharging flow path B. In this configuration, one blower 300, one suction flow path A and one discharging flow path B may be disposed on one battery pack column 740 to decrease air flow resistance. In addition, the air cooling may be controlled independently between the respective battery packs 700 of each column 740.

More specifically, in the embodiment illustrated in accompanying drawings, the battery pack unit 700 may be arranged as two columns 740 in the interior of the housing 100 wherein the battery packs 700 of each column 740 may be spaced from the inner wall at a side end of the airtight housing 100, respectively, to form the discharging flow path B. When the batter pack unit 700 is arranged as two columns, the battery pack may be spaced from the inner side surface of the airtight housing 100 to form the discharging flow path B wherein the respective columns may be spaced at a predetermined distance to form a space. Further, as described above, the partitions 160, 170 for preventing unnecessary air flow may be provided in the space 140 on the respective columns 740.

Additionally, the upper surface and the lower surface of the battery pack unit 700 may be disposed near the inner wall of the airtight housing 100 to prevent a flow path formation and thus the air may flow only through the discharging flow path B in a side of the airtight housing and the suction flow path A to increase air cooling efficiency. In addition, the substantially middle of each blower 300 may be disposed toward to the air passageway 760 wherein each blower 300 and the battery pack unit 700 may be spaced at a predetermined distance from each other. Furthermore, an air tight guide 320 may be disposed on an edge of each blower 300 and may form a closed-flow path to the air passageway 760. A discharging opening 322 connected to the discharging flow path B may be formed in the air tight guide 320 so that air flows are not mixed on a side of each blower 300.

The air tight guide 320 may guide the air traversing through the air passageway 760 of the battery pack unit 700, between each blower and the front portion of the airtight housing 100. Further, the discharging opening 322 may be formed on one side of the air tight guide 320 and the discharging opening 322 may be connected to the discharging flow path B formed between the battery pack unit 700 and the airtight housing 100.

Moreover, the heat exchange device 500 may be disposed on the air tight guide 320 wherein the heat exchange device may be disposed toward the discharging opening 322 and the plurality of radiation fins 520 of the heat exchange device 500 may be disposed on a discharging side of each blower 300. The heat exchange device 500, as arranged above, allows the air suctioned through each blower 300 to be cooled and then discharged to the discharging flow path B. Furthermore, the plurality of radiation fins 520 may be formed on the heat exchange device 500 wherein the direction of the plurality of radiation fins 520 may be the same as the discharged air direction to decrease flow resistance and make substantially rapid flow thereby improving air cooling efficiency.

Additionally, the battery pack unit 700 may be arranged as two columns 740 in the airtight housing 100 wherein each battery pack 700 on the respective column 740 may be spaced from the inner walls of the side portion and rear portion of the airtight housing 100 to form the discharging flow path B. Furthermore, the upper surface and the lower surface of the battery pack unit 700 may be disposed near the inner wall of the airtight housing 100 to prevent forming a flow path. The partition 160 may be formed on the battery pack unit 700 on the respective columns 740 to separate the flow paths on the adjacent rear portions. The partitions 160, 170 may be formed between the respective battery packs. Alternatively, the battery pack unit may be formed on the rear portion space 140 of the airtight housing 100 to form the independent flow path.

Further, the respective rows 720 of the battery pack unit 700 may be spaced at a predetermined distance toward the front portion and the rear portion of the airtight housing. Additionally, an air guide 900 may be disposed in the airtight housing and configured to guide the air from the discharging flow path B to the battery pack unit 700. When the temperature of a portion of the battery pack unit 700 is unbalanced, the air guide 900 corresponding to the battery pack may be opened to suction the cooled air to the corresponding battery pack 700 from the discharging flow path B so the corresponding battery pack 700 may be cooled. In other words, the air guide 900 may serve as an air cooling door.

While the present invention has been illustrated and described with reference to exemplary embodiments, it should be apparent to those skilled in the art to which the present invention pertains that the present invention may be variously improved and changed without departing from the scope of the present invention.

What is claimed is:

1. A battery system, comprising:
an airtight housing;
a plurality of blowers disposed on a side portion of an interior of the airtight housing, the plurality of blowers configured to suction air toward a middle of the airtight housing and discharge the suctioned air to a side of the airtight housing;
a battery pack unit disposed in the airtight housing to form a plurality of rows, wherein an air passageway traverses through a front portion and a rear portion of each row and is disposed at a middle of each blower to form a suction flow path and a discharging flow path; and
a heat exchange device disposed on the discharging flow path in the airtight housing,
wherein the battery pack unit is disposed to form a plurality of rows and a plurality of columns, each having an intra-column flow path therethrough, wherein a plurality of partitions are disposed between each column to separate the intra-column flow paths through adjacent columns, and
wherein the middle of each blower corresponds with the intra-column flow path through a single column, wherein the plurality of blowers and the battery pack unit are spaced apart at a predetermined distance, in which an airtight guide disposed on an edge of each blower forms a closed flow path connecting flow through the single column to the corresponding blower.

2. The battery system of claim 1, wherein each blower and the discharging flow path are disposed at each column of the battery pack unit.

3. The battery system of claim 1, wherein the battery pack unit comprises two columns in the airtight housing, wherein the battery pack on each column is spaced from a side portion of an inner wall of the airtight housing to form the discharging flow path.

4. The battery system of claim 1, wherein an upper surface and a lower surface of the battery pack unit are near the inner wall of the airtight housing to prevent forming a flow path between the upper and/or lower surface and the housing.

5. The battery system of claim 1, wherein the heat exchange device is disposed on the airtight guide wherein toward a discharging opening connected to the discharging flow path.

6. The battery system of claim 1, wherein the heat exchange device includes a plurality of radiation fins disposed on a discharging side of each blower.

7. The battery system of claim 6, wherein the direction of the plurality of radiation fins is the same as the discharged air direction.

8. The battery system of claim 1, wherein the battery pack unit comprises two columns in which the battery pack unit on each column is spaced from the side end inner wall and a rear end inner wall of the housing to form the discharging flow path such that the upper surface and the lower surface of the battery pack unit are adjacent to the inner wall of the airtight housing, and at least one of the plurality of partitions is formed on the air tight housing to separate adjacent intra-column flow paths from one another at their respective rear ends.

9. The battery system of claim 1, wherein each row of the battery pack unit is spaced toward the front portion of the airtight housing and toward the rear portion of the airtight housing in which an air-guide is disposed to suction the air from the discharging flow path.

* * * * *